(12) United States Patent
Kojima (10) Patent No.: US 10,089,898 B2
(45) Date of Patent: Oct. 2, 2018

(54) INFORMATION PROCESSING DEVICE, CONTROL METHOD THEREFOR, AND COMPUTER PROGRAM

(71) Applicant: Akitoshi Kojima, Tochigi (JP)

(72) Inventor: Akitoshi Kojima, Tochigi (JP)

( * ) Notice: Subject to any disclaimer, the term of this patent is extended or adjusted under 35 U.S.C. 154(b) by 232 days.

(21) Appl. No.: 14/910,410

(22) PCT Filed: Aug. 14, 2014

(86) PCT No.: PCT/JP2014/071455
§ 371 (c)(1),
(2) Date: Feb. 5, 2016

(87) PCT Pub. No.: WO2015/022992
PCT Pub. Date: Feb. 19, 2015

(65) Prior Publication Data
US 2016/0217704 A1 Jul. 28, 2016

(30) Foreign Application Priority Data
Aug. 15, 2013 (JP) .................. 2013-168987

(51) Int. Cl.
*G09B 19/00* (2006.01)
*G09B 19/06* (2006.01)
(Continued)

(52) U.S. Cl.
CPC ........... *G09B 19/06* (2013.01); *G06F 17/275* (2013.01); *G06F 17/28* (2013.01); *G09B 5/06* (2013.01); *G09B 5/065* (2013.01); *G09B 7/02* (2013.01)

(58) Field of Classification Search
CPC combination set(s) only.
See application file for complete search history.

(56) References Cited

U.S. PATENT DOCUMENTS 5,537,618 A * 7/1996 Boulton .................. G09B 5/065
434/118
5,692,906 A * 12/1997 Corder .................. G06Q 20/042
434/118
(Continued)

FOREIGN PATENT DOCUMENTS

JP 2003066828 A 3/2003
JP 2007150552 A 6/2007
(Continued)

OTHER PUBLICATIONS

International Search Report for corresponding PCT Application No. PCT/JP2014/071455, 2 pages, dated Nov. 4, 2014.

*Primary Examiner* — Masud Ahmed
(74) *Attorney, Agent, or Firm* — Matthew B. Dernier, Esq.

(57) ABSTRACT

To provide an information processing apparatus for allowing a learner to enjoy viewing and listening of the content and to perform linguistic learning, and to check the effect of learning. A Dictionary DB 101 associates a vocabulary with a difficulty level determined for each vocabulary, and stores the vocabulary and the difficulty level, the vocabulary including a word, an idiom, or a phrase consisting of two or more words in a language to learn. A registration unit 102 registers a degree of learning of the language to learn of a learner as a learning level. A calculating unit 104 calculates the number of the vocabularies to learn used in the content as a frequency in use. A specifying unit 106 specifies, according to the calculated frequency in use and the registered learning level, and among the vocabularies of the language to learn used in the content, a vocabulary which is an object to learn as a vocabulary to learn. A main control unit 113 causes an input operation received by an input unit 111 during the output of the content to be registered as an
(Continued)

input operation in response to the output of the vocabulary to learn.

8 Claims, 7 Drawing Sheets

(51) Int. Cl.
  *G09B 5/06* (2006.01)
  *G09B 7/02* (2006.01)
  *G06F 17/27* (2006.01)
  *G06F 17/28* (2006.01)

(56) References Cited

U.S. PATENT DOCUMENTS

| | | | | |
|---|---|---|---|---|
| 2006/0246411 A1* | 11/2006 | Yang | ............ | G09B 7/00 434/323 |
| 2011/0257961 A1* | 10/2011 | Tinkler | ............ | G09B 7/06 704/9 |
| 2011/0306030 A1* | 12/2011 | Scholler | ............ | G09B 5/06 434/362 |
| 2013/0149681 A1* | 6/2013 | Tinkler | ............ | G09B 7/04 434/167 |
| 2013/0260346 A1* | 10/2013 | Wood | ............ | G09B 5/00 434/156 |
| 2014/0234816 A1* | 8/2014 | Lokuge | ............ | G09B 19/00 434/236 |

FOREIGN PATENT DOCUMENTS

| | | |
|---|---|---|
| JP | 2007206317 A | 8/2007 |
| JP | 2008092403 A | 4/2008 |

* cited by examiner

FIG. 1

| VOCABULARY | LEARNING DIFFICULTY |
|---|---|
| . . . | . . . |
| get | 1 |
| get about | 1 |
| get abroad | 1 |
| . . . | . . . |
| get one's own back | 3 |
| . . . | . . . |
| get under way | 3 |
| . . . | . . . |
| ghost | 2 |
| . . . | . . . |

FIG. 2

| CONTENT No. | VOCABULARY TO LEARN | LEARNING LEVEL | OUTPUT TIMING |
|---|---|---|---|
| A1 | ... | ... | ... |
| | get under way | 3 | 00:15:40, 00:23:41, 01:05:30, ... |
| | get my own back | 3 | 00:40:00, 01:20:41, ... |
| | ... | ... | ... |

| LEARNING DAY | CONTENT No. | LEARNING LEVEL AT A PARTICULAR TIME | PERCENTAGE OF CORRECT ANSWERS (%) | LEARNING LEVEL |
|---|---|---|---|---|
| 2013/06/25 | A1 | 3 | 60 | 3 |
| 2013/07/10 | B2 | 3 | 67 | 3 |
| 2013/07/31 | A2 | 3 | 85 | 4 |
| ... | ... | ... | ... | ... |

FIG. 4B

| LEARNING DAY | CONTENT No. | LEARNING LEVEL AT A PARTICULAR TIME | VOCABULARY TO LEARN | PERCENTAGE OF CORRECT ANSWERS (%) | LEARNING LEVEL |
|---|---|---|---|---|---|
| 2013/06/25 | A1 | 3 | ○○○○ | 40 | 3 |
|  |  |  | △△△△ | 67 |  |
|  |  |  | □□□□ | 85 |  |
| ... | ... | ... | ... | ... | ... |

INFORMATION PROCESSING DEVICE, CONTROL METHOD THEREFOR, AND COMPUTER PROGRAM

TECHNICAL FIELD

The present invention relates to a technology for enjoying viewing and listening of a content while performing linguistic learning.

BACKGROUND ART

It is said that the most effective method for linguistic learning is to get in touch with a language to learn on a daily basis. In one known method, by reading many sentences in the language to learn, e.g., English, reading ability is improved. Along with the popularization of the Internet, an environment which allows easy access for many English sentences has been created. Further, there is also a learning method for causing a learner to view and listen to the content created in the language to learn, such as a movie or music.

However, many vocabularies, e.g., words idioms, and peculiar expressions (phrases), are used in the content such as movie or music. The vocabularies used in the content vary with the categories of the content. For example, there are many types of movies such as a horror movie and an action movie etc.

Therefore, it is difficult to choose a suitable content, among the content in which the user is interested, corresponding to the knowledge level (learning level) of the language to learn for the user.

As to this problem, the linguistic learning apparatus disclosed in a patent document 1 determines the content of learning according to a video teaching material selected, among proposed video teaching materials, by a student and a learning history of the student. Further, based on the content information of teaching material, which is defined according to the determined content of learning, an instruction for learning is given to the student. Thereby, the student can select a video teaching material in which the student is interested among two or more proposed video teaching materials. Thus, the student can learn the language using the content corresponding to the learning history.

Further, the linguistic learning material providing system disclosed in patent document 2 modifies the text so as to correspond to the level of a student. The modification is performed based on the user's linguistic level (learning level), a purpose of learning, and a difficulty of the text. Thereby, the user's reading ability for the language can be improved efficiently.

CITATION LIST

Patent Literature

[PTL 1] Japanese Patent unexamined Publication No. 1-29889
[PTL 2] Japanese Patent unexamined Publication No. 2013-072973

SUMMARY OF INVENTION

Technical Problem

Learning (memorizing) the vocabulary or a characteristic phrase etc., which is frequently used in the user's interested content of the language to learn is important in enjoying viewing and listening of the content. In order to enjoy viewing and listening of a content as well as linguistic learning, the learning content should be adjusted to the learning level of the user.

However, the linguistic learning apparatus disclosed in the patent document 1 analyzes the content of each video teaching material group previously, and selects parts of the video teaching material which can serve as a candidate for learning. Therefore, it is necessary to perform classification of a learning item of the parts, and to perform ranking of the difficulty level of the same. Further, it is necessary for the user (e.g., student) to select an interested content among the proposed video teaching materials. Therefore, the flexibility of the user in selecting a content is restricted.

Further, in the linguistic learning material providing system disclosed in the patent documents 2, to modify a sentence, its sentence type, words and idioms which comprise the sentence are changed based on a changing rule. Therefore, the expression of the proposed sentence to be studied by the user is not identical to that of the sentence of the interested content. In this case, the user may not check the effects of learning since the expression used in the content viewed by the user differs from the expression of the studied sentence. Further, the user may not enjoy viewing and listening of the content when he is annoyed by the difference between the above expressions.

The present invention is mainly directed to provide an information processing apparatus for solving the above problems, for allowing the learner to enjoy viewing and listening of the content while performing linguistic learning corresponding to the learning level, and for allowing the learner to confirm the effect of learning.

Solution to Problem

According to the present disclosure, an information processing apparatus for outputting a content created in a language to learn, comprises: a receiving unit configured to receive an input operation; a recording unit configured to associate a vocabulary with a difficulty level determined for each vocabulary and configured to store the vocabulary and the difficulty level, the vocabulary including a word, an idiom, or a phrase consisting of two or more words in a language to learn; a registration unit configured to register a learning level, which is a degree of learning of the language to learn of a learner; calculating unit configured to calculate a frequency in use, which is the number of the vocabularies to learn used in the content; specification unit configured to specify, according to the calculated frequency in use and the registered learning level, and among the vocabularies of the language to learn used in the content, a vocabulary which is an object to learn as a vocabulary to learn; and control unit configured to cause an input operation received by the receiving unit during the output of the content to be registered as an input operation in response to the output of the vocabulary to learn.

Advantageous Effects of Invention

According to the present invention, the learner can enjoy viewing and listening of the content while performing linguistic learning according to the learning level, and can check the effect of learning.

DESCRIPTION OF EMBODIMENTS

In the following, embodiments are described with reference to the accompanying drawings. In the present embodiment, a description is made for a case where vocabularies including words, idioms, or phrases of a language to learn are extracted from a medium in which a content (e.g., a music content or a movie content) is recorded. The language to learn may be English. French etc. In an alternative embodiment, characters recorded on paper media, such as a book or a magazine, are read with a scanner to perform conversion to text, thereby the characters are extracted from the medium. In the present embodiment, "phrase" means a collection of words, for example, an idiom, conventional phrase or an expression etc. Further, English or French is just for an example, and the language to learn is not restricted to English or French. In addition, even in a case of English, depending on each content, there may be differences in the pronunciation (or an accent, a provincial accent, etc.) between "British English" and "American English". The user can choose a content in consideration of these circumstances.

Figure 1:
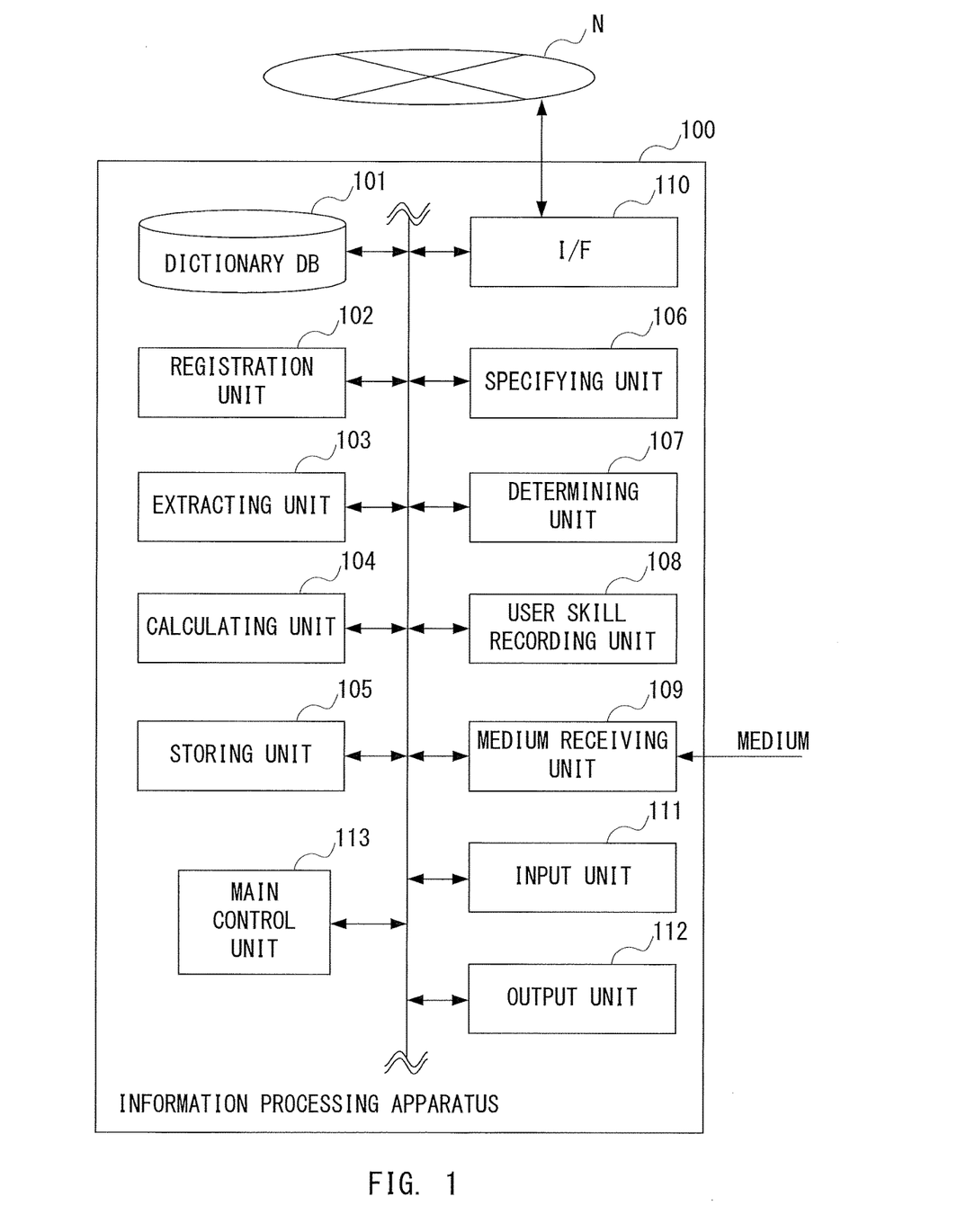
FIG. 1 is a block diagram illustrating an example of a functional configuration of the information processing apparatus.

FIG. 1 is a block diagram illustrating an example of a functional configuration of an information processing apparatus according to the present embodiment. The information processing apparatus 100 in the present embodiment is an apparatus with information processing functions, such as a personal computer, a tablet PC, and a smart phone, for example. The information processing apparatus 100 includes a dictionary DB (database) 101, a registration unit 102, an extracting unit 103, a calculating unit 104, a storing unit 105, an specifying unit 106, a determining unit 107, a user skill recording unit 108, a medium receiving unit 109, I/F (interface) 110, an input unit 111, an output unit 112, and a main control unit 113. Now, a description is given in detail for the arrangement in the following.

The dictionary DB 101 stores vocabularies including words, idioms, or phrases of the language to learn, with each vocabulary related to the difficulty level, which represents a learning difficulty level in learning vocabulary. For example, one or more generally available dictionary data of the language to learn is stored in the dictionary DB 101. This dictionary data includes dictionary data created for a type or attribute of the user (for example, junior high school students, travelers, businessmen etc.). Difficulty in learning is represented in five steps from 1 to 5. For example, difficulty "2" is assigned to the dictionary data for junior high school students, and difficulty "4" is assigned to the dictionary data for businessmen. Further, in the dictionary data created respectively for a beginner class, for a middle class, and for an upper class, etc., difficulty "1" is assigned to the content included in the dictionary data for the beginner class, difficulty "3" is assigned to the content in the middle class dictionary (excluding the content which is also included in the dictionary for beginners). In addition, difficulty "5" is assigned to the content in the upper class dictionary (excluding a content which is also included in the dictionary for beginners and/or in the middle class dictionary). In this case, the learning difficulty level is classified by three steps, i.e., difficulty 1, difficulty 3 and difficulty 5. Further, when two or more types of the dictionary data are stored in the dictionary DB 101, for the vocabularies which are included in two or more types of the dictionary data, the learning difficulty level applied to the lower class is selected and related to the vocabulary. As mentioned, the dictionary DB 101 functions as a storage means configured to store the dictionary data. As to a traveler-oriented dictionary data, for example, the learning difficulty level may be determined according to the priority in learning (or memorizing) the vocabulary.

The registration unit 102 registers the learning level (a user's skill), which represents the degree of learning about the language for the user, into the user skill recording unit 108 (described later). The learning level corresponds to the learning difficulty level of the vocabulary of the language to learn. For example, according to the learning difficulty level of the language to learn stored in dictionary DB 101, the difficulty is classified into 5 steps (level 1 to level 5), or classified into 3 steps. (e.g., the beginner class, the middle class, and the upper class). The learning level registered into the user skill recording unit 108 may be a learning level which is self-reported by a learner (user), or a learning level which is decided by an examiner (e.g., a teacher) of the user. In addition, the learning level of the user is automatically changed (updated), after registration upon first learning, according to the achieved effect of learning. Details will be described later.

Further, the registration unit 102 stores the specific vocabulary of the language to learn and the learning difficulty level of the vocabulary in dictionary DB 101, according to the instructions from a user. For example, if there is a characteristic phrase etc., in an interested category, the user may individually store the characteristic phrase etc., in the dictionary DB 101, using the registration unit 102. In addition, the user can delete the vocabulary stored in the dictionary DR 101 using the registration unit 102. Thereby, the user can perform maintenance for the dictionary DB 101.

The extracting unit 103 extracts vocabulary of the language to learn currently used in the content. The vocabulary is extracted in a form which allows a comparison of the extracted vocabulary with a vocabulary stored in the dictionary DR 101. Further, the extraction is performed for each of "word", "idiom" and "phrase". Extraction conditions may also be previously set for causing the frequently used words, such as a word "a" and a word "for", to be extracted only in a case where the word is included in the "phrase". Thereby the time for extraction may be reduced. Further, the storage area of the memory used for the extraction process may be reduced.

As to the extracted vocabularies, the extracting unit 103 extracts an output timing. The output timing is a timing at which the vocabulary to learn (vocabulary to be learned), which is specified by the specifying unit 106 described later, is used in the content. For example, when "get under way", used in the movie, is a vocabulary to learn, the output timing of the vocabulary to learn is time information representing the time at which the vocabulary to learn, i.e., "get under way" is output, with the starting time being a reproduction (output) start time of this movie. If the vocabulary to learn "get under way" is used two or more times in the movie, for example, respective output timings are extracted for the number of times of use. Further, the output timing can also be represented as time information which includes the time at which the output of the vocabulary to learn "get under way" is started and the time at which the output is completed, for example.

The calculating unit 104 calculates frequency in use (use frequency), for each of the extracted vocabularies, in the content. Specifically, based on the result of extraction, the number of times of extraction (the number of times of use) for each vocabulary is calculated as frequency in use. For users, it is recommended to memorize or understand frequently used vocabularies for enjoying viewing and listening of the content. For example, if the category of the content is a horror movie, vocabularies used in a characteristic expression in the category are recommended to memorize or understand. Similarly, if the category of the content is travel, a name of a country and a name of a city etc., are recommended to memorize or understand. Further, since the vocabularies frequently used in the content are the vocabularies frequently output during viewing and listening of the content, therefore, by memorizing or understanding them, learning efficiency is increased.

The storing unit 105 is a flash memory or a hard disk, etc., for example. The storing unit 105 stores the vocabularies to learn, which are specified by the specifying unit 106 described later, and the associated output timings of the respective vocabularies to learn. The vocabularies to learn stored in the storing unit 105 are vocabularies specified from the content in which user is interested. Therefore, the vocabularies to learn stored in the storing unit 105 may also be utilized as a user's original dictionary (personal dictionary file) in a specific category.

The specifying unit 106 specifies, from the vocabularies of the language to learn extracted from the content, the vocabulary to be learned by the user. In this case, the specifying unit 106 specifies the vocabulary to learn which corresponds to the learning level in descending order according to the frequency of use. In specifying the vocabulary to learn, in descending order according to the frequency of use, 20 vocabularies are specified as a vocabulary to learn, for example. Conditions, for example, the number of vocabularies etc., are previously set. Further, a "word" can be set as the specific object or the "phrase" which contains the "word" according to a learning level as conditions at the time of specifying as other vocabulary to learn can be set as the specific object. Thereby the user can specify the vocabularies to learn according to the object of the learning. In the specification of the vocabularies to learn, a vocabulary which completely matches with a vocabulary stored in the dictionary DB 101 is extracted. However, in another embodiment, by comparing vocabularies stored in the dictionary DB 101 which corresponds to the user's learning level with an extracted vocabulary to learn, it is possible to specify a vocabulary having maximum degree of coincidence (i.e., a vocabulary having highest likelihood).

The determining unit 107 determines whether the receiving timing of an input operation, which is received during the output of the content, is the same as an output timing of the vocabulary to learn or not. Specifically, the determining unit 107 determines that the receiving timing and the output timing are the same when the input operation is being received while a certain vocabulary to learn in the content is output (for example, while "get under way", which is the sentence of the vocabulary to learn, is output with the sound). In addition, after the output of the vocabulary to learn, i.e., "get under way" is completed, and the input operation is received before the elapse of the first predetermined time (for example, 2 seconds), the determining unit 107 may determine that the receiving timing and the output timing are the same. Further, when the input operation is received during the period from the start time of the output of the vocabulary to learn "get under way" to the elapse of the second predetermined time (for example, 5 seconds), the determining unit 107 may determine that the receiving timing and the output timing are the same. The user skill recording unit 108 stores a learning history including the learning level received through the registration unit 102 and information about the content chosen by the user for viewing and listening, etc. Further, in another embodiment, the user skill recording unit 108 may store the learning level for each type, such as a word, an idiom, or a phrase.

A medium receiving unit 109 stores media (for example, DVD: Digital Versatile Disc or card-like recording media) in which the content is recorded in a readable manner. Upon receiving an instruction from the user, reading of the content recorded in the media stored in the medium receiving unit 109 is started. The read content is output to the output unit 112, which is described later. Thereby the user can view and listen to the content such as movies and music, etc. The I/F 110 controls the transfer of the information via the Internet N, or via wireless communications, for example. Further, the user may instruct to download the content stored in a server apparatus (not shown) which is connected to the Internet N to view and listen to the downloaded content.

The input unit 111 is, for example, an input device such as a keyboard or a pointing device for receiving an input operation from the user. The output unit 112 is, for example, a display apparatus such as a display which represents movies and subtitles and the like recorded in the content, and/or a speaker which outputs recorded sound. The output unit 112 displays the specified vocabulary to learn on a display screen of the display apparatus as characters, or outputs the specified vocabulary to learn as sound via the speaker. The output unit 112 displays the result of the determination by the determining unit 107 on a screen again. In the following, the user views and/or listens to the output vocabulary to learn for learning, then, the user starts viewing and listening of the content.

The main control unit 113 controls each component in the information processing apparatus 100. The main control unit 113 is realized by cooperation of hardware resources of a computer apparatus in which a processor and an internal memory are provided, and a predetermined computer program. The computer apparatus is built in the information processing apparatus 100. In addition, the information processing apparatus 100 includes an RTC (Real Time Clock) module which outputs time data representing year, month and day, and a synchronous clock for control actions.

The main control unit 113 stores (or registers) an input operation received during the output of the content, as an input in response to the output of the vocabulary to learn, in the predetermined storing area of the storing unit 105, for example. If the input unit 111 is a keyboard, for example, specifically, the user's pressing operation of the key is recorded. Thus, under the control of the main control unit 113, the number of the input operations performed by the user during the output of the content. i.e., the number of key pressing by the user, is specified. Then, the recorded number for the input operation in response to the output of the vocabulary to learn and the total number of the vocabularies to learn specified by the specifying unit 106 are compared. Thereby the percentage of correct answers, which is one of an index for representing the learning effect for the content viewed or listened by the user, is obtained. For example, assume that the number of the specified vocabularies to learn are 20 (except for duplicated vocabularies), and the total number of outputs (including duplicated vocabularies) for the vocabularies to learn is 50. In this case, if the number of the input operation received during the output of the content output is 25, the percentage of correct answers will be 50 [%]. In addition, when recording the input operation, if a key which is different from the key previously set for the input operation is pressed, the pressing of the key may be ignored.

Further, the percentage of correct answers may be obtained for each vocabulary to learn. In this case, when the determining unit 107 determined that the timing at which the input operation is received (reception tinming) and the timing at which the vocabulary to learn is output are the same with each other, the main control unit 113 records the timing at which the input operation is received. Due to the above operation of the main control unit 113, the percentage of correct answers for each vocabulary to learn is obtained by recording the reception timing for each vocabulary to learn which corresponds to the recorded reception timing based on the output timing of the vocabulary to learn.

The main control unit 113 displays the vocabulary to learn stored in the storing unit. 105 on a screen as characters (or image), or the main control unit 113 outputs the vocabulary to learn from the speaker as a voice. Then, the main control unit 113 starts output of the content. Thereby, the user is prompted to learn the vocabulary to learn before viewing and listening of the content. In the above embodiment, all of the specified vocabularies are output, however, in another embodiment, only a part of the vocabularies to learn are output, then, viewing and listening of the content is started.

In still another embodiment, the input unit. 111 and the output unit 112 may cooperate with a mobile information terminal (for example, a smart phone, a tablet PC, etc.,) which is adapted to bidirectionally communicate with the information processing apparatus 100. The detail of the above embodiment will be described later, as an alternative embodiment.

Figure 2:
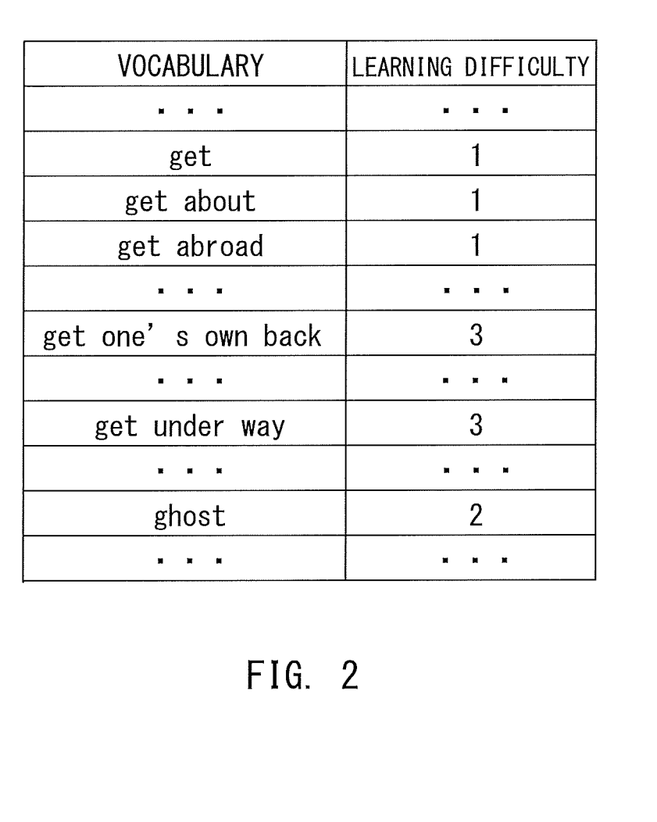
FIG. 2 is an exemplary diagram illustrating examples of vocabularies of the language to learn stored in a Dictionary DB.

FIG. 2 is an exemplary diagram illustrating an example of the vocabularies of the language to learn stored in the dictionary DB 101. As illustrated in FIG. 2, the vocabulary is associated with each item of the learning difficulty level. The vocabularies, such as a word, an idiom, or a phrase, are stored in an item "vocabulary". The information about the difficulty related with each vocabulary is stored in an item "difficulty level."

Figure 3:
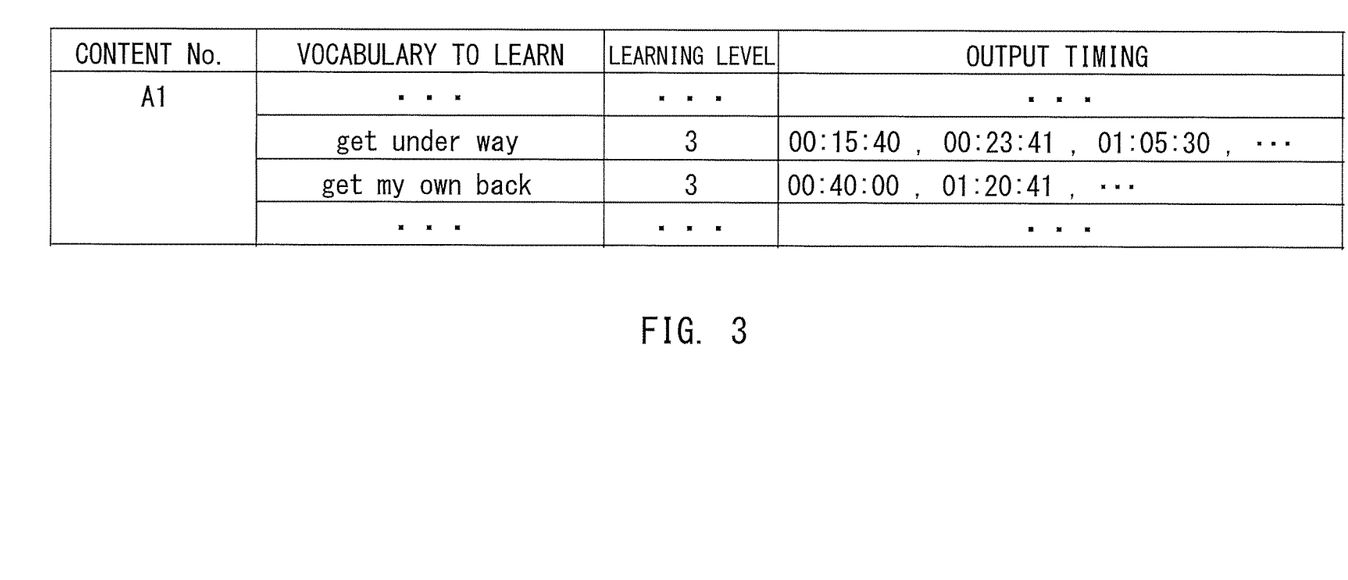
FIG. 3 is an exemplary diagram illustrating an example of vocabularies to learn stored in a memory.

FIG. 3 is an exemplary diagram illustrating an example of the vocabularies to learn stored in a storing unit 105. In FIG. 3, each item of Content No., a vocabulary to learn, a learning level, and output timing are shown. In the item "Content No.", information for uniquely specifying content is stored. "A" in "content A1" represents that the content is classified into a category of action, for example. In the item "vocabulary to learn", a vocabulary to learn specified by the specifying unit 106 is stored. If the category information (genre information) is included in the content, the above information will be extracted upon extraction of the vocabulary of the language to learn by the extracting unit 103. Further, when such information is not included in the content, upon choosing the content, the user inputs the category information via the input unit 111. In the item "learning level", the learning level at the time of specifying the vocabulary to learn is stored. In the item "appearance timing", the output timing of the vocabulary to learn at the time of the content reproduction is stored. For example, for the vocabulary to learn "get under way", it is illustrated that the vocabulary to learn is output, with the reproduction start time of the content as the starting point, at the timing of 15 minutes and 40 seconds, 23 minutes and 41 seconds, and 1 hour 5 minutes and 30 seconds.

Figure 4A:
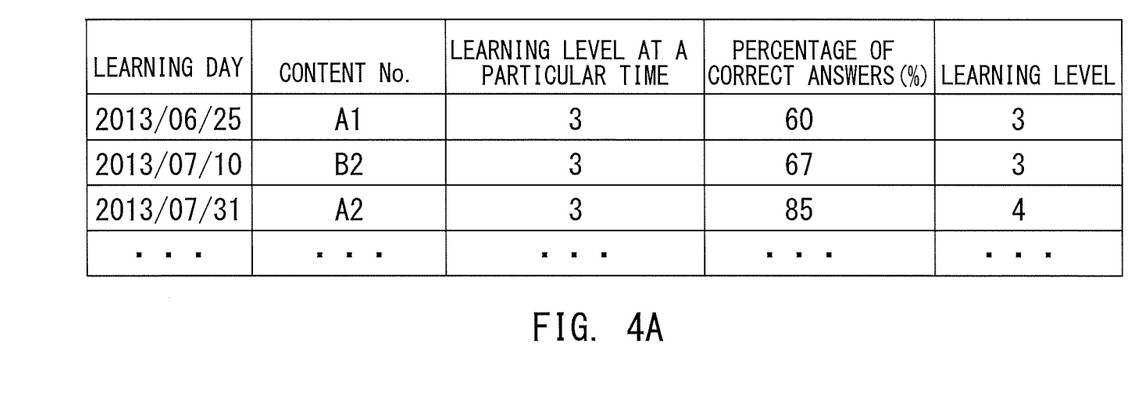
FIGS. 4A and 4B are exemplary diagrams illustrating examples of learning histories recorded in a user skill recording unit.
Figure 4B:
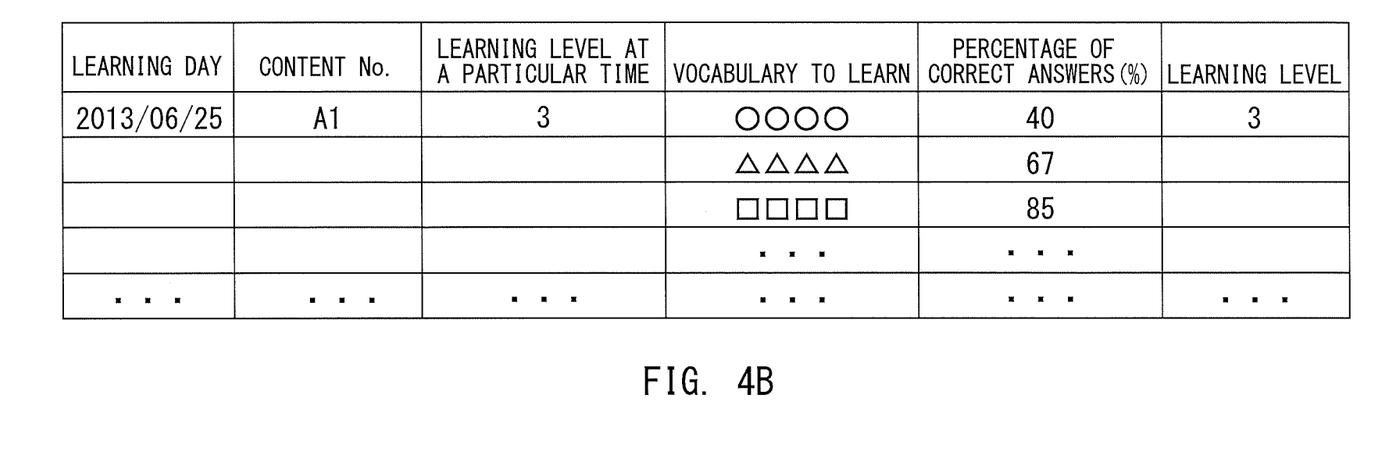

FIGS. 4A and 4B are exemplary diagrams illustrating examples of learning history recorded in the user skill recording unit 108. The learning history illustrated in FIG. 4A includes each item of learning day, Content No., a learning level at a particular time, a percentage of correct answers [%], and learning level. The learning history illustrated in FIG. 4B further includes, in addition to the items illustrated in FIG. 4A, an item of a vocabulary to learn.

The date at which the user learned the vocabulary is stored in the item "learning day" illustrated in FIG. 4A. In the item "Content No.", information for uniquely specifying the content is stored. For example, the content A1 and the content A2 show that the category of each content is classified into a category of action, but each category differs from each other. Further, the content B2 shows that the category of the content B2 is classified into a category of current events (for example, a movie of news), for example. The learning level at the time of specifying the vocabulary to learn is stored in the item "learning level". In the item "percentage of correct answers [%]", the percentage of correct answers [%] for each viewing and listening of the content is stored. In the item "learning level", the learning level modified based on the percentage of correct answers is stored. Modification of a learning level is performed such that the learning level is decreased by one step if the percentage of correct answers remains low level, such as 40 [%]. Further, the modification of a learning level may be performed such that the learning level is increased by one when the percentage of correct answers exceeds 90 [%]. In addition, the learning level at the time of specifying a vocabulary to learn is previously set to be the learning level of the latest learning day. In another embodiment, the learning level at the time of specifying a vocabulary to learn is previously set to be the learning level of the latest learning day that corresponds to the category of the content selected by the user.

In the item "vocabulary to learn" shown in FIG. 4B, a vocabulary to learn for each content, specified by the specifying unit 106, is stored. Further, in the item "percentage of correct answers [%]" illustrated in FIG. 4B, the percentage of correct answers [%] for each vocabulary to learn is stored. In this case, in the item "learning level", the learning level which is modified based on the average value of the percentage of correct answers [%] for each vocabulary to learn is stored.

Figure 5:
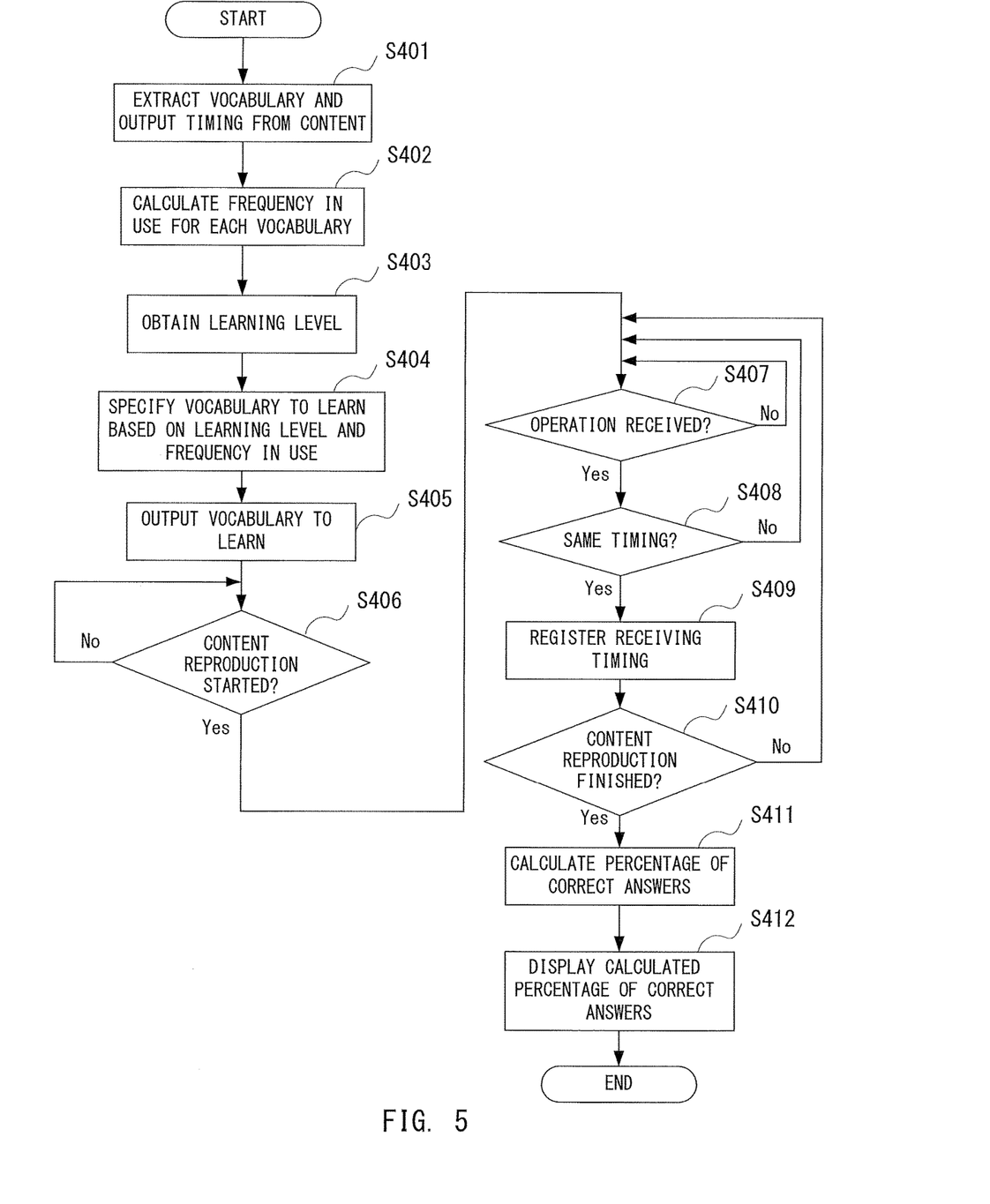
FIG. 5 is a flowchart illustrating an example of processing procedures of the information processing apparatus.

FIG. 5 is a flowchart illustrating an example of processing procedures of the information processing apparatus 100. In addition, each process explained below is realized by the cooperation of the main control unit 113 and functional units included in the information processing apparatus 100. Hereinafter, a description is made for an example in which the percentage of correct answers for each vocabulary to learn, for the content to which the user viewed and listened, is calculated. Further, in the following, when the user succeeded in listening (or catching or understanding) the vocabulary to learn. e.g., "get under way", while the content is reproduced, the user performs an input operation (for example, pushing a key).

The main control unit 113 extracts vocabulary of the language to learn currently used in the content as well as its output timing (S401). The main control unit 113 calculates the frequency in use for each vocabulary extracted by the extracting unit 103 (S402). The result of the calculation is stored in a predetermined area in the storing unit 105, for example. The main control unit 113 obtains the learning level from the user skill recording unit 108 (S403). Further, based on the obtained learning level and the frequency in use, the main control unit 113 specifies the vocabularies to learn from the vocabularies extracted by the extracting unit 103 (S404). The specified vocabularies to learn are associated with the output timing and stored in the storing unit 105.

The main control unit 113 outputs the vocabulary to learn which is specified by the specifying unit. 106 to the output unit 112 (S405). After the process of S405, based on whether a predetermined condition is satisfied not, the main control unit 113 determines whether the output of the content should be started or not (S406). As to the predetermined condition, for example, when a period (for example, 20 minutes), which is necessary for a user to learn the vocabulary, has passed after the vocabulary to learn is output to the output unit 112, it is determined that the predetermined condition is satisfied. Further, in response to receiving an instruction to finish learning from a user, the main control unit 113 may start outputting of the content. When the predetermined condition has been satisfied and the output of the content is started (S406: Yes), the main control unit 113 advances the process to S407. Otherwise (S407: No), the main control unit 113 waits until the predetermined condition is satisfied.

The main control unit 113 detects, during the output of the content, receiving of an input operation from the user (S407). When the receiving of the input operation from a user is detected (S407: Yes), the determining unit 107 determines whether the receiving timing of an input operation is the same as the output timing of the vocabulary to learn or not. When the determining unit 107 determined that both timings are the same (S408: Yes), the main control unit. 113 records the receiving timing of the input operation (S409).

The main control unit 113 determines whether the outputting of the content is finished (S410). Specifically, in response to the detection of a signal which represents finishing of output when the content is completely output, the main control unit 113 determines that outputting of the content is finished. The main control unit 113 calculates the percentage of correct answers for each vocabulary to learn, by comparing the output timing of the vocabulary to learn and the receiving timing of the recorded input operation (S411).

The main control unit 113 outputs the information according to the result of the process of S411 to the output unit 112 (S412). In this embodiment, the information according to the result of the process of S411 is a percentage of correct answers in the current learning, for example. Thereby, the user can confirm the effect of the current learning. Further, the registration unit 102 modifies the learning level according to the percentage of correct answers obtained in S411. For example, when the percentage of correct answers exceeds 80 [%], the learning level is increased by one. The modified learning level is registered or stored in the user skill recording unit 108. Thereby, a series of processes are finished.

Figure 6A:
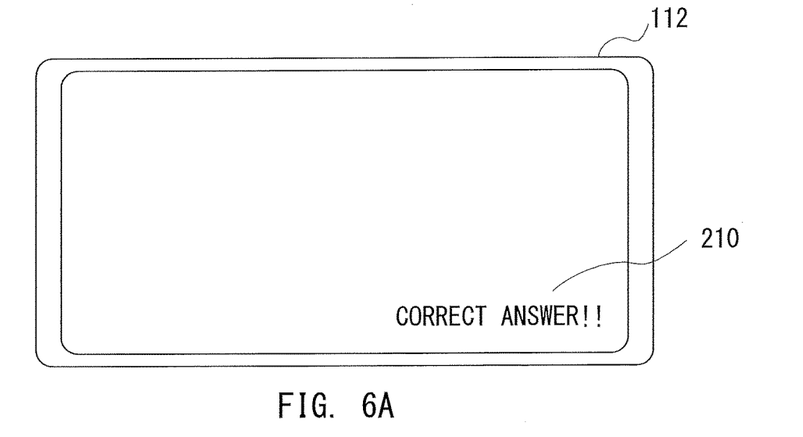
FIGS. 6A, 6B and 6C are diagrams illustrating a screen displaying information for checking a learning effect for a user.
Figure 6B:
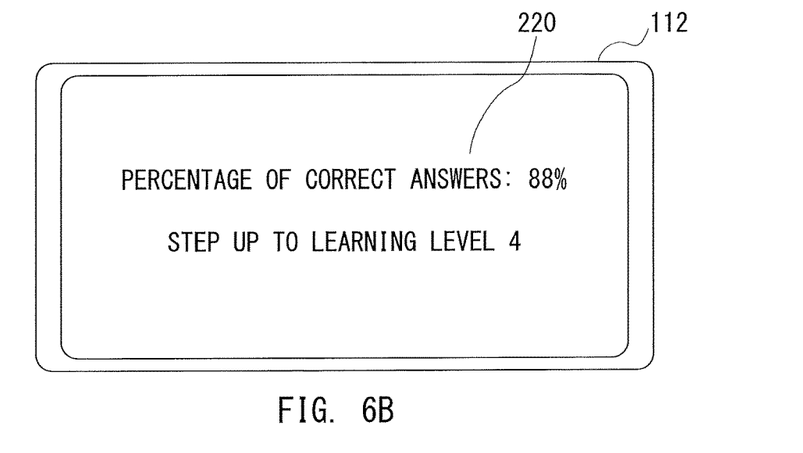

FIGS. 6A, 6B and 6C are diagrams illustrating a display on which information for checking a learning effect for a user is displayed. FIG. 6A illustrates the output unit 112, which is a display in this example, with its screen displaying "correct!!" (210). The information 210 illustrated in FIG. 6A is information displayed when the determining unit 107 determines that the output timing of the vocabulary to learn and the receiving timing of the input operation are the same. FIG. 6B illustrates a display on which the percentage of correct answers in the current learning and the learning level (220) modified based on the result of the percentage are displayed.

In the information 220 illustrated in FIG. 6B, "percentage of correct answers: 88%" and "learning level increased to 4" are displayed.

Figure 6C:
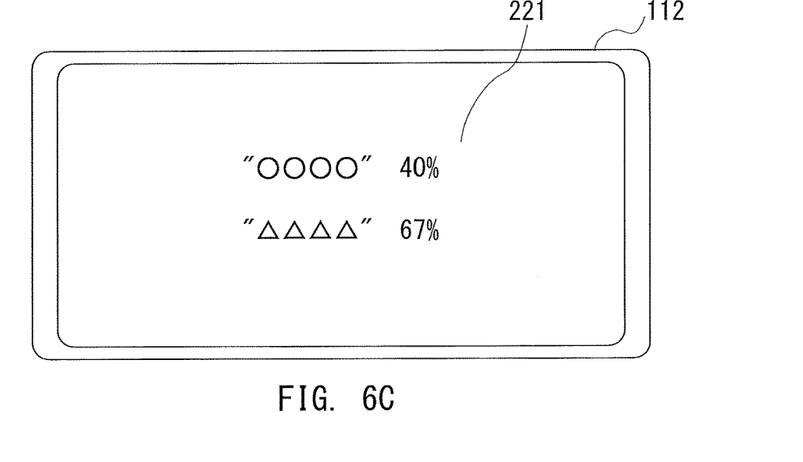

FIG. 6C illustrates a display on which the vocabulary to learn having low percentage of correct answers in the current learning is displayed with the percentage of correct answers. For the information 221 illustrated in FIG. 6C, the percentage of correct answers for the vocabulary to learn "oooo" is "40%", and the percentage of correct answers for the vocabulary to learn "ΔΔΔΔ" is "67%".

By representing these types of information, the user can visually confirm the effect in the current learning and understand the vocabulary to be reviewed, etc. Further, the information may be represented to the user in the form of sound etc., for example.

The information processing apparatus 100 of the present embodiment specifies the vocabularies to learn in descending order according to the frequency of use, based on the user's learning level and the frequency in use of the vocabularies currently used in the content. Further, by registering the input operation received during the output of the content as an input operation in response to the output of the vocabulary to learn, the percentage of correct answers can be calculated.

Thereby, the user can enjoy viewing and listening of the interested content which is created in the language to learn, can perform learning corresponding to the user's learning level, and can confirm the effect of learning. Further, the characteristic phrase in the content etc., can be learned according to the user's learning level. Therefore, for the user, it is possible to enjoy viewing and listening of the content while performing linguistic learning, thereby user's desire to learn is increased and effect of learning is also increased.

Further, even in a case where the user repeats viewing and listening of the same content which the user is interested in, the specified vocabularies to learn are changed with the improvement in the learning level of the user. Therefore, the user does not need to choose an uninterested content for learning.

Further, when repeating viewing and listening of the same content, based on the learning history (FIG. 4B) currently recorded on the user skill recording unit 108, the vocabulary to learn having high percentage of correct answers may be excluded in the next specification process of vocabularies to cause other vocabularies based on the frequency in use to be specified. Even in a case where the learning level is unchanged and the same content is repeatedly learned, it is possible to prevent the user from getting bored of learning. Further, the user does not need to choose the uninterested content for study.

Alternative Embodiment

Figure 7:
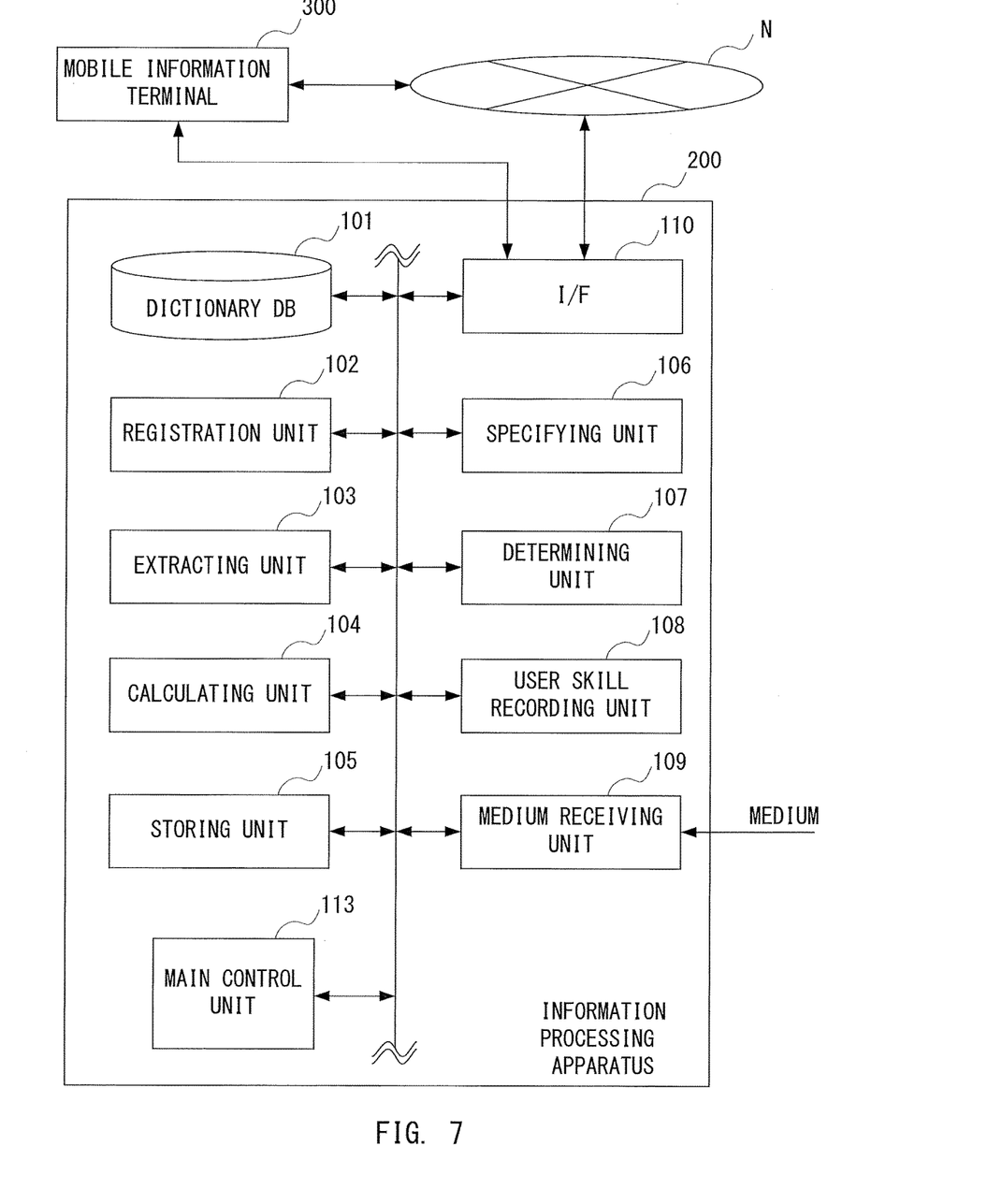
FIG. 7 is an exemplary diagram illustrating an arrangement of an information processing apparatus cooperating with a mobile information terminal.

FIG. 7 is an exemplary diagram illustrating an arrangement of an information processing apparatus cooperating with a mobile information terminal. Note that the same reference symbols are used for the components which are the same as those already described.

An information processing apparatus 200 includes a dictionary DR (database) 101, a registration unit 102, an extracting unit 103, a calculating unit 104, a storing unit 105, an specifying unit 106, a determining unit 107, a user skill recording unit 108, a medium receiving unit 109, I/F (interface) 110, and a main control unit 113. Differing from the information processing apparatus 100 mentioned above, the input unit 111 and the output unit 112 are not included in the information processing apparatus 200.

A mobile information terminal 300 may be a smart phone, a tablet PC, a portable PC, etc., for example, and may comprise a operation button which functions as an input unit, a display which functions as an output unit, and a control unit which controls the above components of the information processing apparatus 200.

Further, using the Internet N or wireless communications (for example, Wi-Fi) and cable communications, etc., the mobile information terminal 300 may transfer a variety of information with the information processing apparatus 200. In this case, the information processing apparatus 200 functions as a server apparatus which transmits a variety of information towards the mobile information terminal 300, or receives a variety of information from the same.

Thus, the mobile information terminal 300 may have functions as a kind of computer.

Thereby, the information processing apparatus 200 may use the input unit included in the mobile information terminal 300 as an input unit 111, and use the output unit included in the mobile information terminal 300 as an output unit 112. Thereby, if it is possible to transfer information with the information processing apparatus 200, the user may perform learning without restriction concerning getting a place to learn, by using the mobile information terminal 300.

In addition, the characteristic function of the present invention is also realizable by installing the computer program of the present invention in the mobile information terminal 300. In this case, the user can perform linguistic learning using only the mobile information terminal 300.

The above embodiments are only the examples to specifically explain the present invention. Therefore, the scope of the invention is not limited to these embodiments.

REFERENCE SIGNS LIST 100, 200 information processing apparatus,
101 dictionary DB
102 registration unit
103 extracting unit
104 calculating unit
105 storing unit
106 specifying unit
107 determination unit
108 user skill recording unit
109 medium receiving unit
110 I/F
111 input unit
112 output unit
113 main control unit
300 mobile information terminal
N internet

The invention claimed is:

1. An information processing apparatus, comprising:
an output unit for outputting a content, the content including at least audible data containing a plurality of vocabulary in a language;
a receiving unit configured to receive a plurality of input operations from a learner based on the learner hearing at least some of the plurality of vocabulary in the output content;
a recording unit configured to associate the plurality of vocabulary with a respective difficulty level determined for each of the plurality of vocabulary, and configured to store the plurality of vocabulary and the respective difficulty level, each of the plurality of vocabulary including a word, an idiom, or a phrase consisting of two or more words in the language;
a registration unit configured to register a learning level, which is a degree of learning of the language to learn of the learner;
calculating unit configured to calculate a respective frequency in use for each of the plurality of vocabulary, where each frequency is a respective number of times that a respective one of the plurality of vocabulary is used in the content;
a specification unit configured to specify a subset of the plurality of vocabulary for learning by the learner according to the respective frequency in use and the registered learning level of the learner; and
a control unit configured to analyze the plurality of input operations received by the receiving unit from the leaner during the outputting of the content, and registering only respective ones of the plurality of input operations that correspond with respective ones of the subset of the plurality of vocabulary.

2. The information apparatus according to claim 1, further comprising:
a storing unit configured to associate a respective output timing for each vocabulary of the subset of the plurality of vocabulary and to store the respective output timing and the subset of the plurality of vocabulary, where each of the output timing is a time at which a respective one of the subset of the plurality of vocabulary to of the content is output; and
a determining unit configured to determine whether the respective output timing for each of the respective ones of the subset of the plurality of vocabulary is substantially the same as respective received timing of the plurality of input operations received by the receiving unit,
wherein the control unit is further configured to register only the respective ones of the plurality of input operations in which the determination indicates that the respective received timing of the respective ones of the plurality of input operations is substantially the same as the respective output timing for each of the respective ones of the subset of the plurality of vocabulary.

3. The information apparatus according to claim 1, wherein the control unit is further configured to output, before starting outputting of the content, the subset of the plurality of vocabulary.

4. The information apparatus according to claim 1, wherein the registration unit is further configured to modify the registered learning level of the learner in response to a number of the registered input operations.

5. The information processing apparatus according to claim 2, wherein the control unit is further configured to output information which indicates each instance in which a respective one of the plurality of input operations is registered.

6. A method for controlling information processing apparatus, comprising:
outputting a content, the content including at least audible data containing a plurality of vocabulary in a language;
receiving a plurality of input operations from a learner based on the learner hearing at least some of the plurality of vocabulary in the output content;

associating the plurality of vocabulary with a respective difficulty level determined for each of the plurality of vocabulary;

storing the plurality of vocabulary and the respective difficulty level, each of the plurality of vocabulary including a word, an idiom, or a phrase consisting of two or more words in the language;

registering a learning level, which is a degree of learning of the language to learn of the learner;

calculating a respective frequency in use for each of the plurality of vocabulary, where each frequency is a respective number of times that a respective one of the plurality of vocabulary is used in the content;

specifying a subset of the plurality of vocabulary for learning by the learner according to the respective frequency in use and the registered learning level of the learner; and analyzing the plurality of input operations received by the receiving unit from the leaner during the outputting of the content, and registering only respective ones of the plurality of input operations that correspond with respective ones of the subset of the plurality of vocabulary.

7. A non-transitory, computer readable storage medium containing a computer program, which when executed by a computer, causes the computer to carry out actions, comprising:

outputting a content, the content including at least audible data containing a plurality of vocabulary in a language;

receiving a plurality of input operations from a learner based on the learner hearing at least some of the plurality of vocabulary in the output content;

associating the plurality of vocabulary with a respective difficulty level determined for each of the plurality of vocabulary;

storing the plurality of vocabulary and the respective difficulty level, each of the plurality of vocabulary including a word, an idiom, or a phrase consisting of two or more words in the language;

registering a learning level, which is a degree of learning of the language to learn of the learner;

calculating a respective frequency in use for each of the plurality of vocabulary, where each frequency is a respective number of times that a respective one of the plurality of vocabulary is used in the content;

specifying a subset of the plurality of vocabulary for learning by the learner according to the respective frequency in use and the registered learning level of the learner; and analyzing the plurality of input operations received by the receiving unit from the leaner during the outputting of the content, and registering only respective ones of the plurality of input operations that correspond with respective ones of the subset of the plurality of vocabulary.

8. An information processing apparatus configured to communicate with an mobile information terminal, which includes input unit for receiving a plurality of input operations from a learner, comprising:

an output unit for outputting a content to the mobile information terminal, the content including at least audible data containing a plurality of vocabulary in a language;

a receiving unit configured to receive the plurality of input operations from the mobile information terminal, where the plurality of input operations are based on the learner hearing at least some of the plurality of vocabulary in the output content;

a recording unit configured to associate the plurality of vocabulary with a respective difficulty level determined for each of the plurality of vocabulary, and configured to store the plurality of vocabulary and the respective difficulty level, each of the plurality of vocabulary including a word, an idiom, or a phrase consisting of two or more words in the language;

a registration unit configured to register a learning level, which is a degree of learning of the language to learn of the learner;

calculating unit configured to calculate a respective frequency in use for each of the plurality of vocabulary, where each frequency is a respective number of times that a respective one of the plurality of vocabulary is used in the content;

a specification unit configured to specify a subset of the plurality of vocabulary for learning by the learner according to the respective frequency in use and the registered learning level of the learner; and a control unit configured to analyze the plurality of input operations received by the receiving unit from the leaner during the outputting of the content, and registering only respective ones of the plurality of input operations that correspond with respective ones of the subset of the plurality of vocabulary.

* * * * *